United States Patent [19]

Roche

[11] Patent Number: 4,984,869

[45] Date of Patent: Jan. 15, 1991

[54] OPTICAL FIBRE CABLE AND METHOD OF MAKING SAME

[75] Inventor: Gaston Roche, Riom, France

[73] Assignee: Satcables (Société en nom collectif), Paris, France

[21] Appl. No.: 409,563

[22] Filed: Sep. 19, 1989

[63] Foreign Application Priority Data

Sept. 9, 1988 [FR] France .................. 8812267

[51] Int. Cl.$^5$ .................. G02B 6/44; B05D 3/12; D02G 3/36
[52] U.S. Cl. .................. 350/96.23; 350/320; 427/356; 427/359; 57/5; 57/9; 57/14
[58] Field of Search ............... 350/96.23, 96.24, 96.10, 350/320; 174/70 R; 427/356, 358, 359; 57/5, 7, 9, 11, 12, 13, 14

[56] References Cited

U.S. PATENT DOCUMENTS

| | | | |
|---|---|---|---|
| 4,166,670 | 9/1979 | Ramsay | 350/96.23 |
| 4,534,618 | 8/1985 | Bruggendieck | 350/96.23 |
| 4,657,342 | 4/1987 | Bauer | 350/96.23 |
| 4,778,246 | 10/1988 | Carroll | 350/96.23 |
| 4,822,133 | 4/1989 | Peacock | 350/96.23 |
| 4,915,490 | 4/1990 | Ramsay et al. | 350/320 |
| 4,929,047 | 5/1990 | Dubots et al. | 350/96.23 |
| 4,932,746 | 6/1990 | Calzolari et al. | 350/96.23 |
| 4,936,647 | 6/1990 | Carroll | 350/96.23 |

FOREIGN PATENT DOCUMENTS

| | | | |
|---|---|---|---|
| 2519050 | 11/1976 | Fed. Rep. of Germany | 350/96.23 X |
| 2541178 | 3/1977 | Fed. Rep. of Germany | 350/96.23 X |
| 58-31302 | 2/1983 | Japan | 350/96.23 X |
| 60-126609 | 11/1985 | Japan | 350/96.23 X |
| 2064811 | 11/1980 | United Kingdom | 350/96.23 X |
| 2185334 | 1/1987 | United Kingdom | 350/96.23 X |

Primary Examiner—Brian Healy
Attorney, Agent, or Firm—Lowe, Price, LeBlanc, Becker & Shur

[57] ABSTRACT

A cable comprises strength members twisted along helicoidal lines of mutual contact, an outer coating covering the strength members and providing helicoidal reception spaces, each of which is delimited by the outer coating, two adjacent strength members and their line of contact. The optical fibres extend in the helicoidal spaces and the length of the fibres is greater than that of the lines of contact defining their reception spaces in order to provide an overlength and to allow variations in length in the strength members.

34 Claims, 2 Drawing Sheets

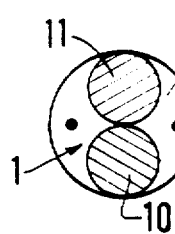 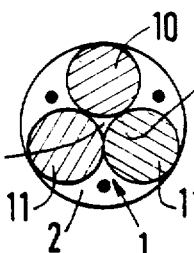 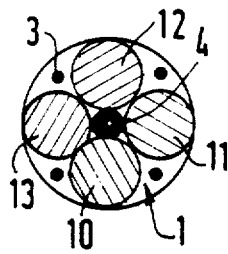 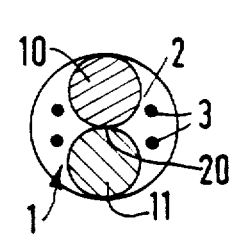
FIG.1a  FIG.1b  FIG.1c  FIG.1d
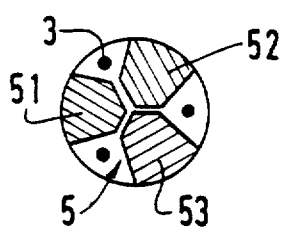 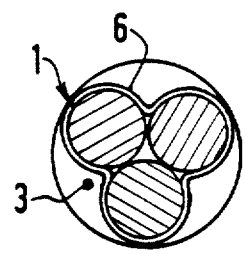
FIG.2  FIG.3
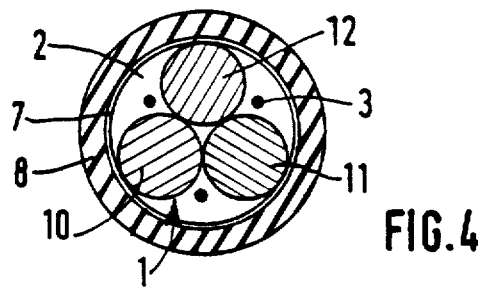
FIG.4

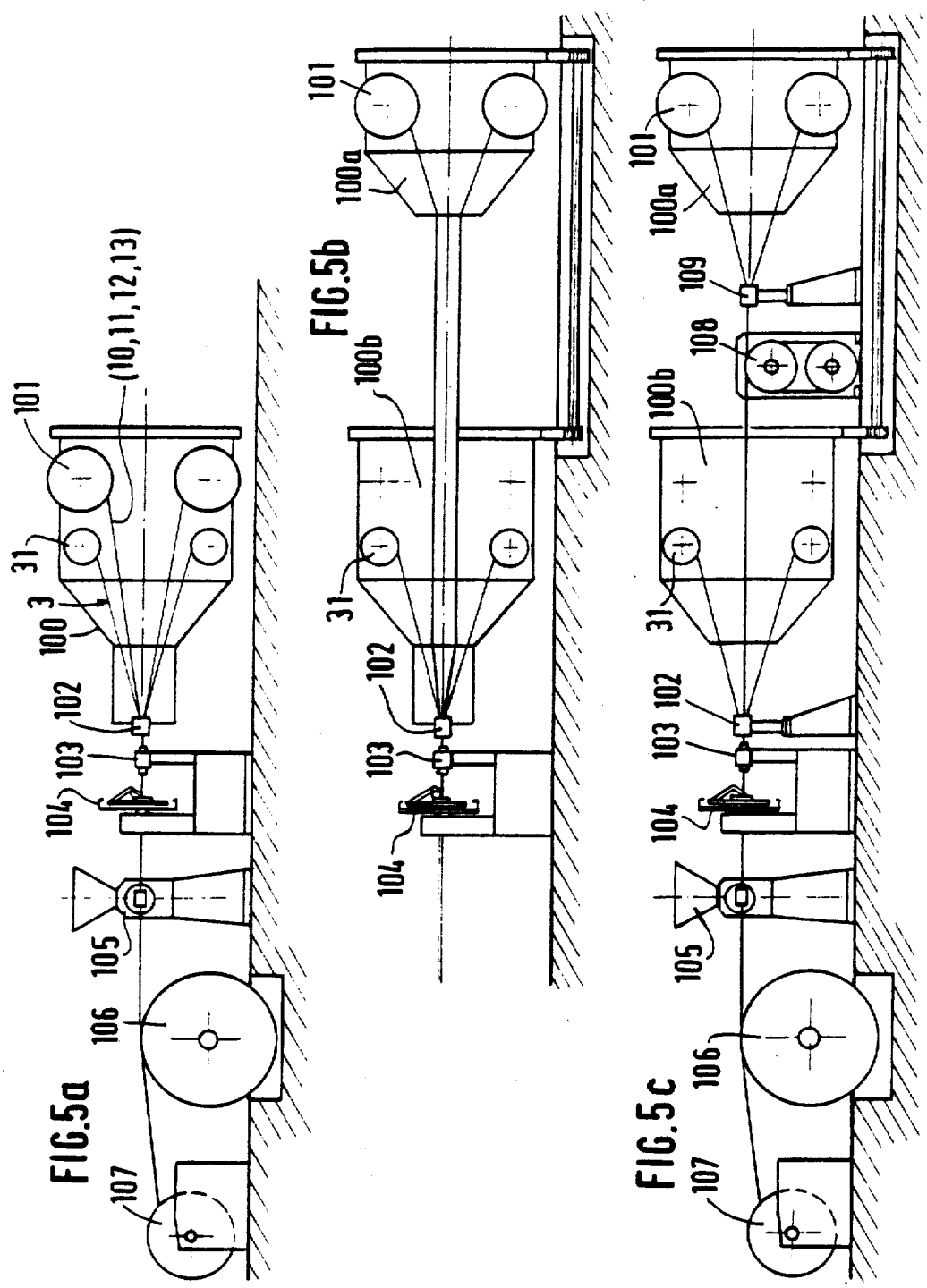

OPTICAL FIBRE CABLE AND METHOD OF MAKING SAME

The present invention relates to an optical fibre cable construction which meets the increasingly stringent requirements of mechanical strength, automated production and reduced cost.

BACKGROUND OF THE INVENTION

It is possible to classify current optical fibre cable constructions into two broad categories with reference to the nature of the phenomena induced in the cables. There are so-called "constrained" constructions in which the fibre is embedded in a plastic material whose behaviour has an effect on the transmission medium. There are also "free fibre" constructions which are more frequently found, and which have an alveolar support having well determined characteristics.

In the "constrained" constructions, there are principally two types of cable. The first type comprises an assembly, in layers or groups, of fibres which are reinforced by way of extrusion of one or more sheaths. The second type uses tapes of fibres having maximum compactness, which are assembled into a matrix which is then twisted.

Broadly speaking, three types of "free fibre" construction have been developed. All three types utilise alveolar carries made of plastic material for receiving the fibres and an antitraction/compression/crushing mechanical reinforcement provided by carriers made of metal or synthetic material which are semi-rigid or flexible, or by a combination thereof. These three types will be briefly described below. For more detailed information, see the journal "Commutation et Transmission", 1982,

Cable Having a Tube Construction

The fibres are protected, either individually or in groups, by tubes made of a thermoplastic material extruded on one or more fibres with radial clearance. The tubes containing the fibres are assembled helically about a central carrier element which can withstand the traction stresses either itself or with the aid of an outer belt of glass fibres or aramide fibres, or of a metallic sheath. The assembly is protected by a sheath made of extruded plastic material.

Alveolar Tape Cable

The fibres are disposed in the grooves of two grooved sheets, which are joined together by heat fusing, in order to form channels in which the fibres can be displaced. The tapes are formed into a stack and then twisted. The whole is covered by a metallic sheath and a sheath made of plastic material.

Grooved Rod Cable

The cabling element comprises a grooved cylindrical rod, the fibres been disposed in the grooves. The rod is made of thermoplastic material and is reinforced by a central carrier which guarantees the mechanical and thermal qualities of the assembly. This support is usually made of steel or a non-metallic material having a high modulus of elasticity such as a glass/hardenable epoxy resin compound. Several rods may be put together to form a cable. The assembly is sheathed by an outer protection which may be a metallic or thermoplastic sheath or a combination thereof, possibly with mechanical reinforcements.

All these constructions require several manufacturing operations and large quantites of various materials for carriering the fibres and guaranteeing their mechanical strength, which makes the finished cables relatively expensive and bulky.

Looking at the category of free-fibre constructions, it can be seen that in all the constructions used until now, the free spaces in which the fibres extend are defined by plastic materials which act as carriers. This leads to proportionally large quantities of plastic materials being used, the mechanical and thermal behaviour of which materials are far removed from those of the optical fibre. Their modulus of elasticity is very low and their coefficient of linear expansion is greater than that of glass by an order of magnitude of $10^1$ to $10^2$.

In order to compensate for the mechanical inadequacy of the plastic support of the fibres of these conventional constructions and the unfavourable effect of their linear variations, which are considerable compared to that of the optical fibre and which occur, for example, during changes in temperature, it is necessary to use mechanical reinforcements having a high modulus of elasticity and a lower coefficient of linear expansion. These provide mechanical strength during traction and compression and should act against any excessive linear variations of the modulus of elasticity. Under these conditions, the greater the section of the plastic material, the more necessary it is to increase the section of the mechanical reinforcement, which has a disadvantageous effect on the cost price of the cable.

The present invention is intended to provide an optical fibre cable of the free type of construction which does not have any of the disadvantages of the above-mentioned constructions.

While preserving the advantages of a free-fiber construction, the invention is intended to solve the problem of linear stresses and to provide an optical cable in a single manufacturing operation in order to reduce the cost thereof.

The invention is also intended to provide an optical cable having a reduced section and reduced weight, which also goes towards reducing the cost of the cable.

The optical cable in accordance with the invention also affords the optical fibres excellent protection against crushing.

Moreover, the optical cable in accordance with the invention enables the fibres to be precisely and easily positioned during manufacture in the locations reserved for them.

A cable is already known from U.S. Pat. No. 4,166,670 which has at least one optical fibre and comprises strenght members, which are twisted along helicoidal lines in mutual contact, and an outer coating covering the strength members and providing helicoidal reception spaces, each of which is defined by the outer coating, two adjacent strength members and their line of contact.

However, the optical fibres of the cable of this specification do not have any overlength. This is for a very good reason, since the central space provided between the three carrier elements of this cable holds a fibre and this space cannot be helicoidal and consequently cannot constitute a free space allowing the fibre to be unaffected by variations in the length of the strength members, which variations occur, for example, in the course of thermal cycles.

The aim of the present invention is thus to improve the cable of U.S. Pat. No. 4,166,670.

SUMMARY OF THE INVENTION

To this end the present invention relates to a cable of the type defined above, characterised by the fact that the fibre extends in one of the said helicoidal spaces and the length of the fibre is greater than that of the line of contact defining its reception space, in order to provide an overlength and to permit variations in the length of the strength members.

In an interesting embodiment of the cable according to the invention, the strength members are cylindrical.

The strength members may be covered by a flexible film.

The invention also relates to a method of manufacturing the cable according to the invention, characterised by the fact that the strength members and the fibre are simultaneously twisted in a single die.

Advantagously, an elongation force is applied to the strength members between drums which unwind said strength member and a capstan, preferably downstream of an extruder for the outer coating.

BRIEF DESCRIPTION OF THE DRAWINGS

The invention will be better understood with reference to the following description, together with the attached drawings, in which:

FIGS. 1a, 1b, 1c and 1d are schematic representations of different examples of an optical module using an optical fibre cable in accordance with the invention;

FIG. 2 shows a variant of the embodiment of FIG. 1b;

FIG. 3 shows another variant of the embodiment of FIG. 1b;

FIG. 4 shows a finished optical cable which is formed by a single module in accordance with the embodiment of FIG. 1b; and FIGS. 5a, 5b and 5c illustrate three modes of using the method according to the invention to manufacture optical cables according to FIGS. 1, 2 and 3.

DESCRIPTION OF THE PREFERRED EMBODIMENTS

Referring to FIG. 1, the invention essentially resides in providing a composite module comprising carrier reinforcement members, and optical fibres interposed between the carrier members. The assembly comprising the elements, carrier members and optical fibres is cabled in a continuous or alternating helix. FIG. 1b illustrates a particular case for which three members (10, 11, 12) are twisted to form the carrier element 1. FIG. 1a illustrates a case having two carrier members (10, 11) which are also twisted. FIG. 1c illustrates a module comprising a carrier element 1 comprising four twisted strands (10, 11, 12, 13). The number of members could be increased, but the carrier element 1 would lose some flexibility. It is advantageous to have between two and five carrier members. As shown in FIG. 1b, the carrier members (10, 11, 12) have a circular section such that two adjacent members define a channel 2 which is a helicoidal space further defined by the helicoidal line 20 of mutual contact of the two members 10, 12 under consideration and, as will be seen below, by an outer coating covering the carrier members, the channel 2 serving as a reception space and a free space for at least one optical fibre 3 whose length is greater than that of the line of contact defining the channel. FIG. 1d represents a strand formed by a support element 1 having two members (10, 11) which are twisted in a helix, each channel 2 receiving two optical fibres 3. It will be noted that the mutual line of contact 20 is unique and extends about the axis of symmetry f the strand and the cable, the latter being in this case cylindrical. The cable of the lines 1b, 1c comprises three or four carriers (10–13) which are in contact in pairs and which provide an internal space 21 containing no fibre.

The assembly comprising the elements, carriers (10, 11, 12) and optical fibres 3 is cabled in a continuous or alternating helix. The step of the helix is determined so as to obtain the overlength of the fibre 3 which is necessary for it to withstand the mechanical and thermal stresses to which the cable will be subjected and hence to permit variations in length of the carrier members, taking into account the dimension of the channel 2 provided between the carrier members (10, 11, 12, 13, . . . ).

The dimension of the carrier members (10, 11, 12, 13, . . . ) is also determined by taking into account the mechanical stresses to which the cable is subjected and the free space required to avoid stress on the fibre 3 once it has been put into position. The carrier members (10, 11, 12, 13) are made of metallic or non-metallic materials having a high modulus of elasticity and a low coefficient of linear expansion compared with thermoplastic materials. The carrier members (10, 11, 12, 13) are advantageously made of steel or a glass/hardenable resin compound, or a carbon fibre/hardenable resin compound. Types of hardenable resin to be considered in particular include epoxyresins, polyester etc.

As can be seen, the strand 1 supporting the optical fibres 3 is made up only by the carrier members (10, 11, 12) and does not require any thermoplastic material, which overcomes the disadvantages brought about by the use thereof as listed above.

The overlength necessary to the optical fibres 3 for them to withstand without constraint the traction and compression stresses to which the cable will be subjected during use is guaranteed at the moment of realisation of the strand by applying to the carrier members (10, 11, 12, 13, . . . ) the force necessary to obtain the desired elongation, as will become apparent below.

In certain cases, in order to meet the conditions of longitudinal tightness of the cable or stability of the strand of carrier members, it may be necessary to provide a filler 4 in the centre of the twist, as shown in FIG. 1c.

Referring to FIG. 2, the optical module is formed by a carrier element 5 comprising members (51, 52, 53) twisted in a helix and optical fibres 3. The members (51, 52, 53) forming the carrier element 5 have a section in the shape of a polygon, selected so as to obtain a very stable support between the members and giving the channel formed between adjacent members a simple triangular shape. In this case, the contact between pairs of members is strictly speaking not in a line but in a plane. However, the plane which defines the fibre receiving channel will continue to be called the line of contact.

It may be interesting, as shown in FIG. 3, to cover the external surface of the strand 1 of the carrier members (10, 11, 12) with a plastic film 6 having a very small thickness of the order of several tenths of millimetres, in order to hold the fibres 3 above the tangential line of the carrier members (10, 11, 12) in order to prevent them coinciding with one another.

It would also be possible to insert in the channels 2 of the carrier members (1, 5) optical fibres 3 placed in tubes or sheaths of plastic material, although some of the advantages provided by the invention are lost in this embodiment.

FIG. 4 shows a section through a finished cable which comprises three carier members (10, 11, 12) supporting three optical fibres 3. Longitudinal tightness is ensured by a lubricating material which fills the free spaces 2. External protection is provided by a polyester tape 7 and a sheath 8 made of plastic material. A cable having the construction shown in FIG. 4, which has three optical fibres 3 and which can withstand traction of 220 daN and bending over a radius of 50 mm, has an outer diameter of the order of 5 mm with an outer protective sheath having a thickness of 0.8 mm. With a protective sheath of the same thickness, a conventional cable, which has a grooved rod and the same performance, has an outer diameter of around 7 mm, which gives it a cross section around two times greater than that of the cable according to the invention.

However, an optical cable according to the invention may also be formed by an assembly of optical modules in accordance with one of the variations shown in FIGS. 1 to 3, each module being advantagously covered by a polyester tape 7 or a sheath of plastic material, or a combination thereof, each module comprising an appropriate number of optical fibres, the assembly being covered by an outer protective sheath made of plastic material.

Taking into account the good mechanical strength of each of the modules, it is not essential to provide an optical cable formed in this way with additional mechanical reinforcement.

FIGS. 5a, 5b and 5c are schematic representations of three different embodiments of equipment enabling the desired overlength of the optical fibres to be obtained on a production line in accordance with the invention.

The production line shown in FIG. 5a comprises a single rotating cage 100 carrying spools 101 onto which carrier members (10, 11, 12, 13) are wound and spools 31 onto which the optical fibres 3 are wound. The force applied to each of the carrier members (10, 11, 12, 13) enables the desired elongation of the carrier strand to be obtained between the cage 100 and a pull-off capstan 106, in this case having a tangential rotational speed different to that of the spools 101, in order to give the optical fibres 3 the overlength required when the strand is slackened after it has passed over the capstan 106.

The optical fibres are cabled and twisted at the same time as the carrier members, with a very weak tension of the order of 50 grams, passing through the same rotating die 102 as that which ensures cabling of the carrier strands (10, 11, 12). A tape-lapping device 104 allows a tape 7 to be placed helically around the optical module formed in this way. An extruder 105 extrudes an outer sheath 8. A device 103 for injecting lubricating filling material ensures the longitudinal sealing of the cable if necessary. The injection device 103 is disposed between the stranding point of the die 102 and the tape-lapping device 104. The optical cable manufactured in this way is wound onto a drum 107 at the end of a single operation. The carrier strand (1, 5) is manufactured at the same time as the optical cable itself.

In the embodiment of FIG. 5b, which is a variant of that of FIG. 5a, the single rotating cage has been replaced by two separate cages $100_a$ and $100_b$ which rotate synchronously. The cage $100_a$ carries the carrier members (10, 11, 12, 13, 51, 52, 53) and the cage $100_b$ carries the optical fibres 3. Apart from this difference, this manufacturing line is identical to that of FIG. 5a.

In the embodiment of FIG. 5b, the overlength of the optical fibres 3 is obtained by applying pressure to the drum 101 carrying the carrier members (10, 11, 12, 13, 51, 52) towards the rear as above.

In the embodiment of FIG. 5c, the production line comprises rotating cages ($100_a$ and $100_b$) for the carrier members (10, 11, 12, 13, 51, 52, 53) and the optical fibres 3 respectively, which cages are also synchronous. The rest of the line is substantially identical to that of FIG. 5a. However, a feed capstan 108 is inserted between the two cages $100_a$ and $100_b$. This capstan 108 receives the carrier strand (1, 5) coming from a stranding point 109. The stranding point 109 receives carrier members (10, 11, 12, 13, 51, 52, 53) coming from the drums 101 and moved by the rotating cage $100_a$.

The force applied to the carrier strand (1, 5) is strictly regulated and controlled between the two capstans 108 and 106, which cooperate with one another to apply the elongation force and to obtain the precise overlength desired for the optical fibres 3.

The optical cable is wound, as in the other lines, onto the drum 107.

One important advantage obtained by an optical fibre cable made in this way is that it ensures excellent protection of the fibres against crushing. The fibres are directly protected by the carrier members, which are solid and hard, which gives the optical cable very good crush resistance.

A further advantage with respect to manufacture of the cable must be mentioned, namely that it is easier to correctly postion the fibres in the spaces reserved for them. In fact, the operations for positioning the carriers and the optical fibres are carried out simultaneously on the same production line and it is therefore very easy to ensure perfect synchronisation of the cabling of the carrier members and the optical fibres.

The invention is particularly well suited to the economic manufacture of cables containing a reduced number of optical fibres, that is less than ten, without this number being limiting to the invention. In fact, for an optical cable having a determined construction, the relative importance to the cost of the cable of the auxiliary materials used (plastic modules and carriers) is greater the lower the number of optical fibres contained by the cable, if the price per unit of length of the fibre installed is considered. The same applies to manufacturing time. Thus, cables having very small numbers of optical fibres are the ones which provide the greatest utilization of the gains in auxiliary material and manufacturing time afforded by the construction according to the invention.

In order to obtain an optical cable containing a greater number of optical fibres whilst, preserving the above advantages regarding cost and mechanical quality, it is possible to have an assembly of several optical modules such as those described with reference to FIGS. 1 to 3. The good mechanical strength of each of these optical modules generally makes it possible to do without an additional mechanical reinforcement. A simple outer sheath will suffice.

It is quite obvious that all sorts of outer protections may be used to complete the sheath of plastic material covering the optical module while remaining within the essence of the invention. The same applies when additional mechanical reinforcements are disposed on the periphery of the cable in order for example to improve resistance to traction.

What is claimed is:

1. A cable having at least one optical fibre, comprising strength members which are twisted along helicoidal lines of mutual contact, an outer coating covering the strength members and providing helicoidal reception spaces each of which is defined by the outer coating, two adjacent strenght members and their line of contact, characterised by the fact that the fibre extends in one of said helicoidal spaces and the length of the fibre is greater than the length of the contact line defining its reception space in order to provide an overlength and to permit variations in the length of the strength members.

2. A cable as claimed in claim 1, in which two strength members are provided which are twisted along a helicoidal contact line extending about an axis of symmetry of the cable.

3. A cable as claimed in claim 1, in which at least three strength members are provided which are in contact in pairs and provide an internal space containing no fibre.

4. A cable as claimed in claim 1, wherein the material for the strength members is selected from the group consisting of: steel, glass fibre/hardenable resin compound and carbon fibre/hardenable resin.

5. A cable as claimed in claim 1, in which the strength members have a circular section which defines a free space which has a curvilinear contour.

6. A cable as claimed in claim 1, in which the strength members have a polygonal section.

7. A cable as claimed in claim 1, in which the optical fibres are embedded in a lubricating filling material.

8. A cable having at least one optical fibre, comprising:
strength members twisted along helicoidal lines of mutual contact;
a thin film made of flexible material covering the outer surface of the twist formed by said strength members; and
an outer coating covering the strength members and providing helicoidal reception spaces each of which is defined by the outer coating, two adjacent strength members and their line of contact, wherein the optical fibre extends in one of said helicoidal spaces and the length of the optical fibre is greater than the length of the contact line defining its reception space so as to provide an overlength and to permit variations in the length of the strength members.

9. An optical cable as claimed in claim 1, in which a helicoidal tape is provided around said strength members and optical fibres.

10. A cable as claimed in claim 1, wherein the optical fibre is placed in a flexible tube having cross section diameter smaller than the diameter of said strength members.

11. A method of manufacturing a cable having at least one optical fibre comprising the steps of:
encasing the strength members with an outer coating covering the strength members such that helicoidal reception spaces are each defined by the outer coating, two adjacent strength members and their line of contact,
inserting said optical fibre in one of said helicoidal spaces with the length of the optical fibre being greater than the length of the contact line defining its reception space so as to provide an overlength and to permit variations in the length of the strength members, and
simultaneously twisting the strength members and the optical fibre in a single die whereby the strength members are twisted along helicoidal lines of mutual contact.

12. A method as claimed in claim 11, wherein an elongating force is applied to the strength members between cable drums which unwind said strength members and a first capstan.

13. A method as claimed in claim 11, wherein the strength members and the optical fibres are wrapped in a tape which is placed helicoidally by means of a tape-lapping device, and then in an outer sheath by means of an extruder.

14. A method as claimed in claim 13, in which an elongating force is applied to the strength members between drums which unwind said strength members and a capstan, and the capstan is disposed downstream of said extruder.

15. A method as claimed in claim 12, in which the drums unwinding the strength members and the drums unwinding the optical fibres are rotated by means of a rotating cage.

16. A method as claimed in claim 12, in which the drums unwinding the strength members and the drums unwinding the optical fibres are driven by means of two synchronous rotating cages respectively.

17. A method as claimed in claim 16, wherein a second capstan is disposed between said rotating cages and receives said strength members, which are stranded by means of a die, said first capstan cooperating with said second capstan to apply said elongating force.

18. A method of manufacturing a cable having at least one optical fibre comprising the steps of:
encasing the strength members with an outer coating covering the strength members such that helicoidal reception spaces are each defined by the outer coating, two adjacent strength members and their line of contact,
inserting said optical fibre in one of said helicoidal spaces with the length of the optical fibre being greater than the length of the contact line defining its reception space so as to provide an overlength and to permit variations in the length of the strength members, and
twisting the strength members along helicoidal lines of mutual contact.

19. A cable as claimed in claim 8, wherein two strength members are provided, said strength members twisted along a helicoidal contact line extending about an axis of symmetry of the cable.

20. A cable as claimed in claim 8, wherein at least three strength members are provided which are in contact in pairs and provided an internal space containing no optical fibre.

21. A cable as claimed in claim 8, wherein the material for the strength members is selected from the group consisting of: steel, glass fibre/hardenable resin compound and carbon fibre/hardenable resin.

22. A cable as claimed in claim 8, wherein the strength members have a circular section which defines a free space which has a curvilinear contour.

23. A cable as claimed in claim 8, wherein the strength members have a polygonal section.

24. A cable as claimed in claim 8, wherein the optical fibre is embedded in a lubricating filling material.

25. A cable as claimed in claim 8, a helicoidal tape is provided around said strength members and optical fibre.

26. A cable as claimed in claim 8, wherein the optical fibre is placed in a flexible tube having a cross section smaller than the diameter of said strength members.

27. A cable manufactured according to the process comprising the steps of:
encasing the strength members with an outer coating covering the strength members such that helicoidal reception spaces are each defined by the outer coating, two adjacent strength members and their line of contact,
inserting said optical fibre in one of said helicoidal spaces with the length of the optical fibre being greater than the length of the contact line defining its reception space so as to provide an overlength and to permit variations in the length of the strength members, and
twisting the strength members along helicoidal lines of mutual contact.

28. A cable manufactured according to claim 27, wherein the strength members and the fibre are twisted simultaneously in a single die.

29. A cable manufactured according to claim 28, wherein an elongating force is applied to the strength members between cable drums which unwind said strength members and a first capstan.

30. A cable manufactured according to claim 28, wherein the strength members and the optical fibres are wrapped in a tape which is placed helicoidally by means of a tape-lapping device, and then in an outer sheath by means of an extruder.

31. A cable manufactured according to claim 30, wherein an elongating force is applied to the strength members between cable drums which unwind said strength members and a first capstan, said first capstan disposed downstream of said extruder.

32. A cable manufactured according to claim 29, wherein the drums unwinding the strength members and a drum unwinding the optical fibre are rotated by means of a rotating cage.

33. A cable manufactured according to claim 29, wherein the drums unwinding the strength members and a drum unwinding the optical fibre are driven by means of two synchronous rotating cages respectively.

34. A cable manufactured according to claim 33, wherein a second capstan is disposed between said rotating cages and receives said strength members, which are stranded by means of a die, said first capstan cooperating with said second capstan to apply said elongating force.

* * * * *

UNITED STATES PATENT AND TRADEMARK OFFICE
CERTIFICATE OF CORRECTION

PATENT NO. : 4,984,869

DATED : January 15, 1991

INVENTOR(S) : Gaston ROCHE

It is certified that error appears in the above-identified patent and that said Letters Patent is hereby corrected as shown below:

On the title page:

Please correct item [63] to read as follows:

--[63] Sept. 20, 1988 [FR] ..................... 8812267--.

Signed and Sealed this

Nineteenth Day of May, 1992

*Attest:*

DOUGLAS B. COMER

*Attesting Officer*      *Acting Commissioner of Patents and Trademarks*